Figure 1:
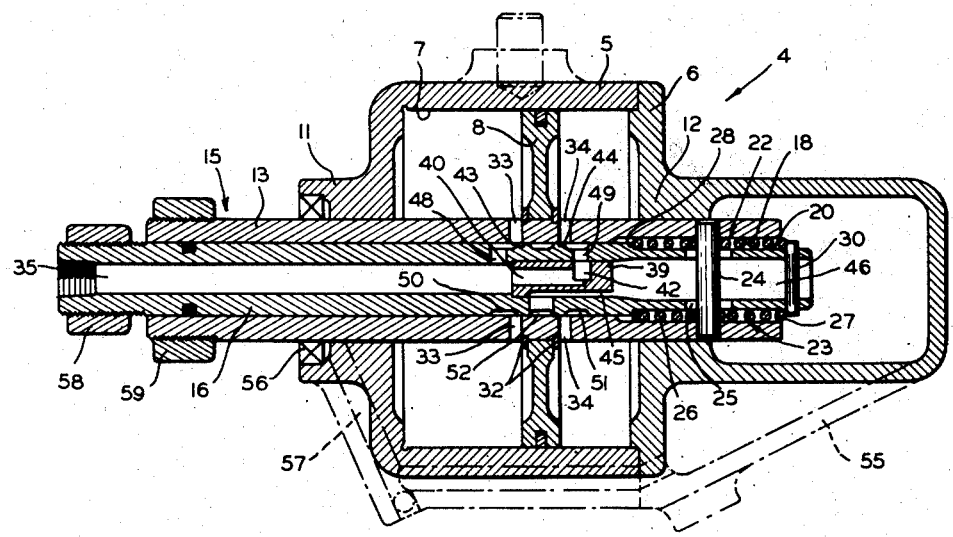

March 1, 1960  W. F. LEONARD ET AL  2,926,635

POWER SHIFTING MECHANISM

Filed Dec. 24, 1957

INVENTORS.
WILLIAM F. LEONARD
LEWIS E. HENYON
BY
ATTYS.

United States Patent Office 2,926,635
Patented Mar. 1, 1960

2,926,635

POWER SHIFTING MECHANISM

William F. Leonard and Lewis E. Henyon, Jackson, Mich., assignors to Clark Equipment Company, a corporation of Michigan Application December 24, 1957, Serial No. 704,935

8 Claims. (Cl. 121—41)

Our invention relates to power shifting mechanism and has utility, for example, with multi-shift transmissions for self-propelled vehicles.

In the operation of machines such as, for example, multi-shift transmissions in heavy duty self-propelled vehicles, it is desirable for the operator or driver to have the machine under his selective manual control, but to afford efficiency in effecting change in direction of drive or drive ratio it is desirable that a power source be called into play for that purpose.

Our present invention is concerned with the aforementioned problem, and, accordingly, it is an object of our invention to provide power shifting mechanism which includes means manually operable to effect a desired shifting operation and which means, when manually actuated, affords the application of a power source to effect or assist the shifting operation.

In order to achieve the aforesaid object, we provide a motor preferably in the form of a power cylinder and piston assembly adapted to be actuated by fluid under pressure, and control valve means comprising valve seat means and valve means movable with respect to each other, and in which the control valve means is associated with the power cylinder and piston assembly for controlling admission of fluid under pressure to and the venting of the power cylinder to effect movement of the power piston, which, in turn, is adapted to have connection with a part to be driven as, for example, a shifter rail or shifter member of a multi-shift transmission.

A preferred feature of our invention resides in an organization of parts as last noted, in which the control valve means has the valve seat means thereof in the form of a sleeve which is connected to the power piston for movement therewith; in which the valve means is in the form of rod means slidable axially in the valve seat sleeve; and in which the control valve means is arranged coaxially of the power piston and cylinder.

A further preferred feature resides in providing the valve rod with suitable means including an axially extending bore to provide, in one position of the valve rod relative to the valve seat means, for the admission of fluid under pressure to the power cylinder at opposite ends of the power piston to retain the power piston against movement in the power cylinder.

A further feature resides in providing the valve rod with suitable axially extending bore means and divider means within the bore means to afford the connection of the power cylinder at opposite ends of the power piston with a source of fluid under pressure and vent or sump to effect movement of the valve seat sleeve and the power piston in the power cylinder.

A further preferred feature is in the provision of lost motion connecting means between the valve seat sleeve and valve rod and in which relative axial movement of the valve seat sleeve and valve rod afforded by the lost motion connection means provides for movement of the power piston in the power cylinder.

A further preferred feature is in the provision of an arrangement, as noted, of spring means between the valve seat sleeve and valve rod to dispose normally the control valve means so that fluid under pressure is admitted to the power cylinder at opposite ends of the power piston so as to retain the power piston in desired position within the power cylinder.

The aforementioned spring means of the control valve means further importantly functions to provide a sense of feel to the operator as though he were manually making a selected shift although the power piston is effecting or assisting in applying the shifting force.

A further preferred feature resides in the provision of valve seats formed as a portion of the surface of a cylinder for the sleeve valve seat means, and cylindrical valves for the valve rod for cooperating with such cylindrical form of valve seats.

A further preferred feature resides in providing lost motion connecting means at adjacent ends of the valve seat sleeve means and valve rod in the form of pin means extending transversely of the axis of the valve seat sleeve means and valve rod, which pin means has its opposite ends disposed in the valve seat sleeve means and in which an intermediate portion of the pin means is disposed in axially extending slot means in the valve rod.

A still further preferred feature resides in the construction last noted in which a pair of balancing springs are arranged between the valve seat sleeve means and the valve rod at opposite sides of the pin means of the lost motion connection means to normally dispose the valve seat sleeve means so as to connect the power cylinder with the source of fluid under pressure at opposite ends of the power piston.

Further objects, features and advantages of our invention will appear in the following detail description.

Now, in order to acquaint those skilled in the art with the manner of constructing and utilizing a power shifting mechanism in accordance with our invention, we shall describe in connection with the accompanying drawings, a preferred embodiment of our invention.

Figure 2:
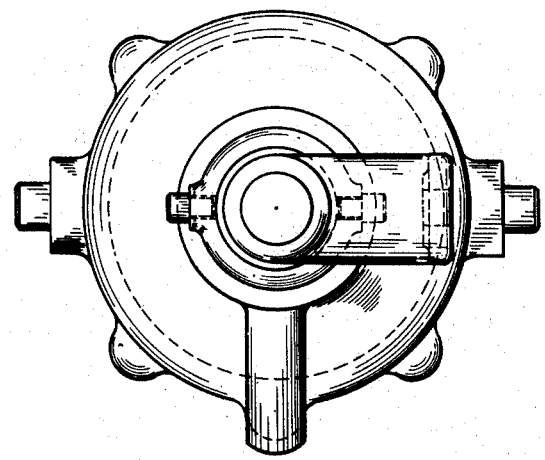

In the drawings:

Figure 1 is a longitudinal sectional view of a power shifting mechanism constructed in accordance with our invention; and Figure 2 is an elevational view of the power shifting mechanism shown in Figure 1.

Referring now to the drawings, there is shown a power shifting mechanism comprising motor means in the form of a power piston and cylinder assembly, indicated generally at 4, which comprises a casing formed by a generally cup-shaped main body member 5 and an end cap housing 6 suitably secured at one end of the body member 5 for enclosing the latter. The main body member 5, as shown, is formed with a cylindrical bore defining a power cylinder 7 within which there is disposed a power piston 8. The main body member 5 and end cap housing 6 are formed with journal portions 11 and 12, respectively, in and through which valve seat means in the form of a valve seat sleeve 13 of control valve means, indicated generally at 15, is mounted for sliding movement coaxially of the axis of the power cylinder 7.

The control valve means 15 further comprises a valve rod 16 mounted coaxially of the axis of the valve seat sleeve 13 for sliding movement therein. As shown, the valve seat sleeve means 13 at its end adjacent journal 12 of end cap housing 6 is formed with a cylindrical bore 18 and the adjacent end portion of the valve rod 16 is formed with a cylindrical outer surface 20 of less diameter than the interior diameter of the bore 18 with the two surfaces defining an annular chamber 22 therebetween. Adjacent the last noted end portions of the valve seat sleeve 13 and valve rod 16, there is provided lost motion connection means 23 comprising a pin 24 which extends transversely of the valve seat sleeve 13 and the valve rod 16. The opposite ends of the pin 24 are secured in the valve seat sleeve 13. As shown, the pin passes through an elongated or axially extending slot 25 formed in the valve rod 16. A pair of balanced springs 26—27 are disposed with one end of each to either side of, and in engagement with, the pin 24. The other end of spring 26 has seating engagement with a shoulder 28 at the inner end of cylindrical outer surface 20 of the valve rod 16, and the other end of spring 27 seats against a pin 30 extending transversely of and fixed at its opposite ends in the outer projecting end of valve rod 16. The two springs 26—27 are preferably in the embodiment of the invention shown of equal strengths and hence are effective to dispose normally the valve rod 16 and valve seat sleeve 13 in positions with respect to each other in which the pin 24 of the lost motion connecting means 23 is centered axially of the slot 25 in the valve rod 16.

The power piston means 8 previously mentioned is secured to the valve seat sleeve 13 within the power cylinder 7 by a pair of snap rings 32—32 so that the power piston 8 and valve seat sleeve 13 are connected together for conjoint axial movement. The valve seat sleeve 13 is also provided with a plurality of transversely extending bores 33 and 34 providing two pairs of valve seats opening into the power cylinder 7 at opposite ends of the power piston 8.

The valve rod 16, as shown, is hollow and includes axially extending bores 35. Intermediate the ends of bore 35 there is disposed in fixed relation therein flow divider means 39 having a bore 40 extending partially thereinto and coaxially of the bore 35 of the valve rod 16, and which bore 40 at its inner end has a transversely extending inlet port 42. The valve rod 16 further comprises a pair of spaced apart cylindrical valves 43 and 44 arranged for cooperation with the valve seats formed as portions of the surface of a cylinder at the inward ends of bores 33 and 34 of the valve seat sleeve 13. Also as shown, the flow divider means 39 is formed with a groove 45 in its outer periphery, which extends lengthwise partially thereof and which opens into a vent passageway means 46 formed in the end portion of the valve rod 16 extending into the end cap housing 6. Further, the valve rod comprises a pair of radially extending ports 48 and 49, which communicate, respectively, with first and second annular grooves 50 and 51, and in which annular grove 50 has connection with bore 35 through port 48 and annular groove 51 has connection with bore 40 of flow divider means 39 through port 42 and radially extending port 49. Intermediate valves 33 and 34, the valve rod 16 is provided a third annular groove 52 which, it will be later seen, comprises a part of vent passageway means for exhausting, selectively, the power cylinder 7 at opposite ends of the power piston 8.

In the position of the parts shown in Figure 1 in which the valve rod 16 is in its normal position relative to the valve seat sleeve 13, it will be observed that fluid under pressure is adapted to be admitted into bore 35 and through the latter bore, port 48, annular recess 50 and valve seat 33 opposite one end of power piston 8, and through bore 40 of the pressure divider means 39, port 42, port 49 and annular recess 51 to power cylinder 7 opposite the other end of power piston 8. Thus, in the position of the parts shown in the drawings, fluid under pressure is admitted to the power cylinder 7 opposite both ends of the power piston 8 and the power piston 8, accordingly, will be retained in the position shown. When the valve rod 16 is shifted either to the left or to the right as permitted by the aforedescribed lost motion connecting means 23, one of the valve seats 33 or 34 is closed and the other is connected to vent as described below. In this regard, assume that the valve rod 16 is moved to the left, spring 26 is placed under compression and valve seat 33 is closed by valve 43 so that fluid under pressure from the pressure source is admitted to and through bore 35, port 40 of the flow divider means 39, port 42, and annular recess 51 through the valve seat 34 to the power cylinder 7 to the right of the power piston 8, as shown in the drawing. The power cylinder 7 to the left of the power piston 8 is connected to vent via valve seat 33, annular vent recess 52 which is now in alignment therewith, lengthwise groove 45 and through the enlarged bore 46 to vent or sump, whereupon the power piston 8 and valve seat sleeve 13 are conjointly moved to the left. Should valve rod 16 be released, the balanced springs 26 and 27 will again center the pin 24 in slot 25 of lost motion connecting means 23 to return the valve rod 16 and valve seat sleeve 13 to the position shown in the drawings, whereupon fluid under pressure is admitted to the power cylinder 7 at opposite ends of the power piston 8, and movement of the power piston 8 is stopped.

It will be understood that the power shifting mechanism aforedescribed may be actuated by any suitable fluid under pressure, such as air or liquid, as may conveniently be available. Should liquid, such as oil under pressure, be utilized, it is preferable to provide a sump, as shown at 55, to receive fluid discharged through the aforementioned vent passageway. In this connection, it will be seen that the journal portion 11 adjacent the packing 56 to provide a seal about valve seat sleeve 13 is ported at 57 so that fluid collected thereat is returned to sump. As previously indicated, if air under pressure is employed, the vent passageway means may discharge to atmosphere. For purposes of the invention, any mode of affording differential pressures to the power cylinder 7 at opposite ends of power piston 8 to effect movement of the latter and to balance the pressure in the power cylinder 7 at opposite ends of the power piston 8 may, of course, be utilized.

It is believed that it will be clear that the power shifting mechanism above described has ready application, for example, to an assembly comprising a gear shift mechanism and a multi-shift transmission. In such orientation of parts, the valve rod 16 is adapted to have suitable connection by connecting member 58 to the gear shift lever of the gear shift mechanism and the valve seat sleeve 13 is adapted to have connection through connecting member 59 with a gear shift mechanism to afford application of force to a selected shifter member or shifter rail of a transmission. Thus, the valve rod 16 is under the manual control of an operator to initiate the shifting movement and such shifting movement causes the valve rod 16 to move either to the left or the right to place spring 26 or spring 27 under compression and effect, through the passageway means above described, movement of the valve seat 13 in one direction or the other. Movement of the valve set sleeve 13, as previously described, thus affords force for effecting the actuation of the multi-shift transmission. It will be apparent that in using the power shifting mechanism of our invention, that it is necessary for the operator or driver of the vehicle to maintain sufficient force on the valve rod 16 to overcome one or the other of the balancing springs 26 and 27, and if the operator should release the valve rod 16 before completing a shifting operation movement of the power piston 8 will be arrested in the power cylinder 7. Also, at the completion of a shift, when the manually operable gear shift lever is released, pressure is, for the reasons already noted, admitted to the power cylinder 7 at opposite ends of the power piston 8 so that the transmission is retained in its last shifted position, and is conditioned for immediate subsequent operation as may be required.

In the event of power failure for actuating the power shifting mechanism as above related, the mechanism may be manually actuated by the operator moving valve rod 16 relative to valve seat sleeve 13 to take up the lost motion of slot 25, after which the pin 24 is engaged and valve seat sleeve 13 and piston 8 are caused to be moved by continued manual application of force to valve rod 16 and then effect the desired shifting operation.

While we have shown and described what we consider to be a preferred embodiment of our invention, it will be understood that various modifications and rearrangements may be made therein without departing from the spirit and scope of the invention.

We claim:

1. Power shifting mechanism for association with a source of fluid under pressure comprising, casing means having a cylindrical bore defining a power cylinder, control valve means comprising valve seat means mounted in said casing coaxially of said power cylinder, and valve rod means mounted for sliding movement in said valve seat means coaxially thereof, power piston means mounted on said valve seat means for movement in said power cylinder, lost motion means comprising pin means carried by said valve seat means and extending transversely of the axis of said valve rod and said valve seat means, and said valve rod having a slot extending lengthwise thereof and within which an intermediate portion of said pin means is disposed to afford for relative lengthwise movement of said valve seat means and said valve rod means with respect to each other.

2. Power shifting mechanism for association with a source of fluid under pressure comprising, casing means having a cylindrical bore defining a power cylinder, control valve means comprising valve seat means mounted in said casing coaxially of said power cylinder, and valve rod means mounted for sliding movement in said valve seat means coaxially thereof, power piston means mounted on said valve seat means for movement in said power cylinder, lost motion means comprising pin means carried by said valve seat means and extending transversely of the axis of said valve rod and said valve seat means, said valve rod having a slot extending lengthwise thereof and within which an intermediate portion of said pin means is disposed, and balancing spring means between said pin means and said valve seat means and said valve rod for normally disposing said pin means in said slot intermediate the ends thereof.

3. Power shifting mechanism for association with a source of fluid under pressure comprising, casing means having a cylindrical bore defining a power cylinder, control valve means comprising valve seat sleeve means mounted for movement in said casing coaxially of said power cylinder, and valve rod means mounted for sliding movement in said valve seat sleeve means coaxially thereof, power piston means in said power cylinder and secured to said valve seat sleeve means, said valve seat sleeve means having a pair of valve seats, said valve seat sleeve means having passages at said valve seats opening into said power cylinder at opposite ends of said power piston, said valve rod means having a pair of valves for opening and closing said valve seats, lost motion connecting means between said valve seat sleeve means and said valve rod means, pressure passageway means and vent passageway means in said valve rod means, said lost motion means affording positioning of said valve rod means relative to said valve seat sleeve means to dispose said pair of valves in open relation to said pair of valve seats to admit fluid under pressure through said pressure passageway means from said source of fluid under pressure to said power cylinder through said passages in said valve seat sleeve means at opposite ends of said power piston, and to close said vent passageway means; and to dispose one of said pair of valves in position to connect the passage in said valve seat sleeve means at one of said pair of valve seats with said pressure passageway means to admit fluid under pressure to said power cylinder opposite one end of said power piston, and to connect the passage in said valve seat sleeve means at the other of said pair of valve seats with said vent passageway means to vent said power cylinder opposite the other end of said power piston.

4. Power shifting mechanism for association with a source of fluid under pressure comprising, casing means having a cylindrical bore defining a power cylinder, control valve means comprising valve seat sleeve means mounted for movement in said casing coaxially of said power cylinder, and valve rod means mounted for sliding movement in said valve seat sleeve means coaxially thereof, power piston means in said power cylinder carried by said valve seat sleeve means, said valve seat sleeve means having a pair of valve seats, said valve seat sleeve means having passages at said valve seats opening into said power cylinder at opposite ends of said power piston, said valve rod means having a pair of valves for opening and closing said valve seats, lost motion connecting means comprising pin means carried by said valve seat sleeve means and extending transversely of the axes of said valve seat sleeve means and said valve rod means, and slot means extending lengthwise of said valve rod means and in which an intermediate portion of said pin means is disposed, pressure passageway means and vent passageway means in said valve rod means, said lost motion connecting means affording positioning of said valve rod means relative to said valve seat sleeve means to dispose said pair of valves in open relation to said pair of valve seats to admit fluid under pressure through said pressure passageway means from said source of fluid under pressure to said power cylinder through said passages in said valve seat sleeve means at opposite ends of said power piston and to close said vent passageway means; and to dispose said one of said pair of valves in position to connect the passage in said valve seat sleeve means at one of said pair of valve seats with said pressure passageway means to admit fluid under pressure to said power cylinder opposite one end of said power piston, and to connect the passage in said valve seat sleeve means at the other of said pair of valve seats with said vent passageway means to vent said cylinder opposite the other end of said power piston.

5. Power shifting mechanism for association with a source of fluid under pressure comprising, a casing means having a cylindrical bore defining a power cylinder, control valve means comprising a valve seat sleeve means mounted for movement in said casing coaxially of said power cylinder, and valve rod means mounted for sliding movement in said valve seat sleeve means coaxially thereof, power piston means in said power cylinder carried by said valve seat sleeve means, said valve seat sleeve means having a pair of valve seats, said valve seat sleeve means having passages at said valve seats opening into said power cylinder at oposite ends of said power piston, said valve rod means having a pair of valves for opening and closing said pair of valve seats, lost motion connecting means comprising pin means carried by said valve seat sleeve means and extending transversely of the latter and said valve rod means, and slot means extending lengthwise of said valve rod means and in which an intermediate portion of said pin means is disposed, pressure passageway means and vent passageway means in said valve rod means, spring means between said valve seat sleeve means and said valve rod means to dispose normally said pair of valves in open relation to said pair of valve seats to admit fluid under pressure through said pressure passageway means from said source of fluid under pressure to said power cylinder through said passages in said valve seat sleeve means at opposite ends of said power piston, and to close said vent passageway means; and said valve rod means being movable against the force of said spring means afforded by said lost motion connecting means to disposed said one of said valves of said pair of valves in position to connect the passage in said valve seat sleeve means at one of said pair of valve seats with said pressure passageway means to admit fluid under pressure to said power cylinder opposite one end of said power piston, and to connect the passage in said valve seat means at the other of said pair of valve seats with said vent passageway means to vent said cylinder opposite the other end of said power piston.

6. Power shifting mechanism for association with a source of fluid under pressure comprising, a casing means having a cylindrical bore defining a power cylinder, control valve means comprising valve seat sleeve means mounted for movement in said casing coaxially of said power cylinder, and valve rod means mounted for sliding movement in said valve seat sleeve means coaxially thereof, power piston means in said power cylinder and carried by said valve seat sleeve means, said valve sleeve means having a pair of valve seats, said valve seat sleeve means having passages at said valve seats opening into said power cylinder at opposite ends of said power piston, said valve rod means having a pair of valves for opening and closing said valve seats, lost motion connecting means between one end of said valve seat sleeve means and one end of said valve rod means carried by said valve seat sleeve means and comprising pin means extending transversely of the latter and said valve rod means, and slot means extending lengthwise of said valve rod means at said one end thereof and in which an intermediate portion of said pin means is disposed, said valve seat sleeve means having a bore at said one end thereof, said valve rod means at said one end thereof having a cylindrical outer surface of less diameter than said bore of said valve seat sleeve means to provide an annular chamber therebetween, pressure passageway means and vent passageway means in said valve rod means, and balancing springs one to either side of said pin means and disposed in said annular bore to dispose normally said valve rod means relative to said valve seat sleeve means to position said pair of valves in open relation to said pair of valve seats to admit fluid under pressure through said pressure passageway means from said source of fluid under pressure to said power cylinder through said passage in said valve seat sleeve means at opposite ends of said power piston, and to close said vent passageway means; and to dispose one of said valves of said pair of valves in position to connect the passage in said valve seat sleeve means at one of said pair of valve seats with said pressure passageway means to admit fluid under pressure to said power cylinder opposite one end of said power piston, and to connected the passage in said valve seat sleeve means at the other of said pair of valve seats with said vent passageway means to vent said power cylinder opposite the other end of said power piston.

7. Power shifting mechanism for association with a source of fluid under pressure comprising, casing means having a cylindrical bore defining a power cylinder, control valve means comprising valve seat sleeve means mounted in said casing coaxially of said power cylinder, and valve rod means mounted for sliding movement in said valve seat sleeve means coaxially thereof, power piston means in said power cylinder and carried by said valve seat sleeve means, said valve seat sleeve means comprising a pair of valve seats having cylindrical seating surfaces and opening into said power cylinder at opposite ends of said power piston, said valve rod means having a pair of spaced apart cylindrical valves for opening and closing said valve seats, fluid pressure passageway means in said valve rod means including a pair of spaced annular grooves, vent passageway means in said valve rod means including a third annular groove lying between said pair of annular grooves, and lost motion connecting means between said valve seat sleeve means and said valve rod means, said lost motion connecting means affording positioning of said valve rod means relative to said valve seat sleeve means to disposed said cylindrical valves in open relation with said pair of valve seats and with said pair of annular grooves in communication with said valve seats to admit fluid under pressure through said pressure passageway means from said source of fluid under pressure to said power cylinder at opposite ends of said power piston, and to close said vent passageway means; and to dispose one of said pair of valves in position to connect one of said pair of annular grooves with said pressure passageway means to admit fluid under pressure to said power cylinder opposite one end of said power piston, and to connect the other of said pair of valve seats through said third annular groove to said vent pasageway means to vent said power cylinder opposite the other end of said power piston.

8. Power shifting mechanism for association with a source of fluid under pressure comprising, casing means having a cylindrical bore defining a power cylinder, control valve means comprising valve seat sleeve means mounted in said casing coaxially of said power cylinder, and valve rod means mounted for sliding movement in said valve seat sleeve means coaxially thereof, power piston means in said power cylinder and carried by said valve seat sleeve means, said valve seat sleeve means comprising a pair of valve seats having cylindrical seating surfaces and opening into said power cylinder at opposite ends of said power piston, said valve rod means having a pair of spaced apart cylindrical valves for opening and closing said valve seats, said valve rod means having an axially extending bore and flow divider means disposed in said bore to define fluid pressure passageway means including a pair of spaced annular grooves and vent passageway means including a third annular groove lying between said pair of annular grooves, and lost motion connecting means between said valve seat sleeve means and said valve rod means, said lost motion connecting means affording positioning of said valve rod means relative to said valve seat sleeve means to dispose said cylindrical valves in open relation with said pair of valve seats and with said pair of annular grooves in communication with said valve seats to admit fluid under pressure through said pressure passageway means from said source of fluid under pressure to said power cylinder at opposite ends of said power piston, and to close said vent passageway means; and to dispose one of said pair of valves in position to connect one of said pair of annular grooves with said pressure passageway means to admit fluid under pressure to said power cylinder opposite one end of said power piston, and to connect the other of said pair of valve seats through said third annular groove to said vent passageway means to vent said power cylinder opposite the other end of said power piston.

References Cited in the file of this patent

UNITED STATES PATENTS

| | | |
|---|---|---|
| 2,507,674 | Mogk | May 16, 1950 |
| 2,661,723 | Johnson | Dec. 8, 1953 |
| 2,865,336 | Leboucher | Dec. 23, 1958 |

FOREIGN PATENTS

| | | |
|---|---|---|
| 204,270 | Australia | Nov. 8, 1956 |